United States Patent
Nishikai et al.

(10) Patent No.: US 7,217,026 B2
(45) Date of Patent: May 15, 2007

(54) ILLUMINATOR, LIQUID CRYSTAL DISPLAY COMPRISING IT AND LAMP SOCKET

(75) Inventors: Akiko Nishikai, Yokohama (JP); Akihiro Horibe, Yamato (JP)

(73) Assignee: International Business Machines Corporation, Armonk, NY (US)

(*) Notice: Subject to any disclaimer, the term of this patent is extended or adjusted under 35 U.S.C. 154(b) by 268 days.

(21) Appl. No.: 10/475,685

(22) PCT Filed: Dec. 21, 2001

(86) PCT No.: PCT/JP01/11319

§ 371 (c)(1),
(2), (4) Date: Apr. 26, 2004

(87) PCT Pub. No.: WO02/086382

PCT Pub. Date: Oct. 31, 2002

(65) Prior Publication Data

US 2004/0179152 A1    Sep. 16, 2004

(30) Foreign Application Priority Data

Apr. 18, 2001  (JP) .............................. 2001-120015

(51) Int. Cl.
*F21V 7/04*  (2006.01)
(52) U.S. Cl. ...................... 362/611; 362/600; 362/614; 362/632
(58) Field of Classification Search ................ 362/600, 362/611, 614, 630, 632, 633, 634
See application file for complete search history.

(56) References Cited

U.S. PATENT DOCUMENTS

| 4,659,183 A | 4/1987 | Suzawa |
| 6,848,810 B2 * | 2/2005 | Steiner et al. ............... 362/224 |

FOREIGN PATENT DOCUMENTS

| DE | 199 60 240 A1 | 6/2000 |
| EP | 0 420 072 A2 | 4/1991 |
| JP | 2-120705 | 9/1990 |
| JP | 10-308113 | 11/1998 |
| JP | 11-345514 | 12/1999 |
| JP | 2000-182567 | 6/2000 |
| WO | WO 02/086382 A1 | 6/1996 |

* cited by examiner

Primary Examiner—Thomas M. Sember
Assistant Examiner—Adam C. Rehm
(74) Attorney, Agent, or Firm—Scully, Scott, Murphy & Presser, P.C; Douglas W. Cameron, Esq.

(57) ABSTRACT

A lighting system includes a light guide plate, having a plane of incidence into which light enters and a plane of emission from which the light is emitted, a light source, having a luminous portion and a non-luminous portion, that is located adjacent to the light guide plate so that the light guide plate is irradiated by light. The system further includes a lamp socket, for holding at least one end of the light source, and a reflector, which is extended along the light source for reflecting the light produced by the light source. The lamp socket exhibits a transmittance of 20 to 90% in wavelengths of from 300 to 900 nm, and the light is scattered through the lamp socket. An embodiment discloses also relates to a display device using the above described side light device.

9 Claims, 18 Drawing Sheets

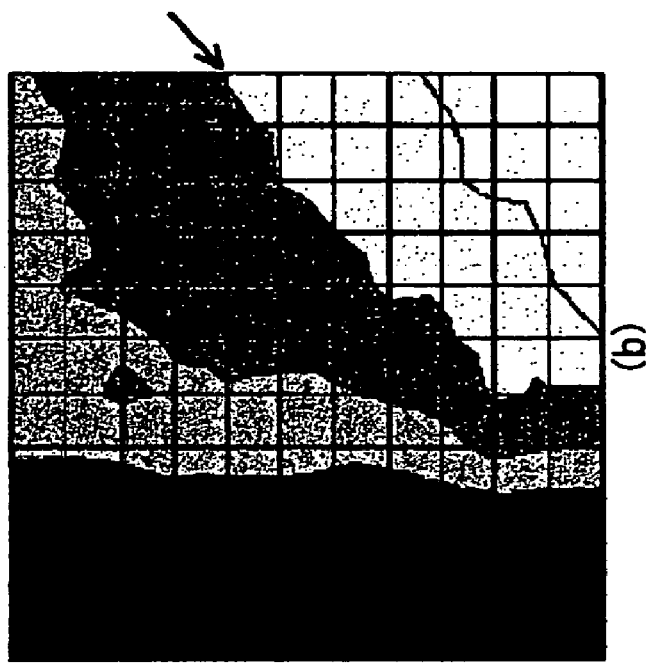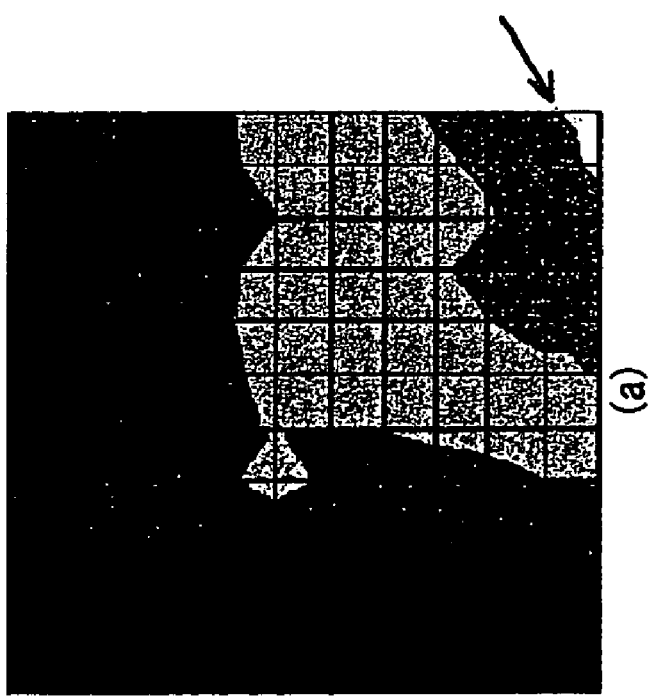
Fig. 13

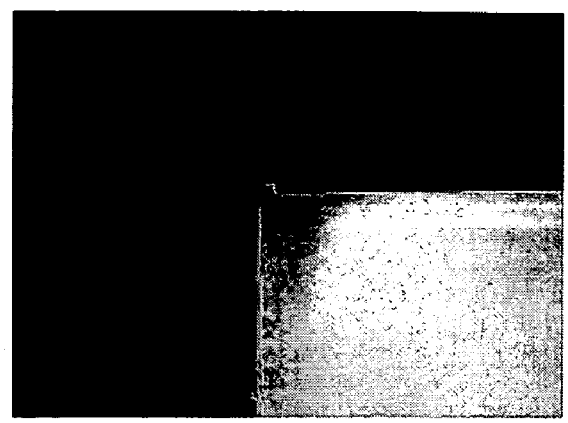
(a)
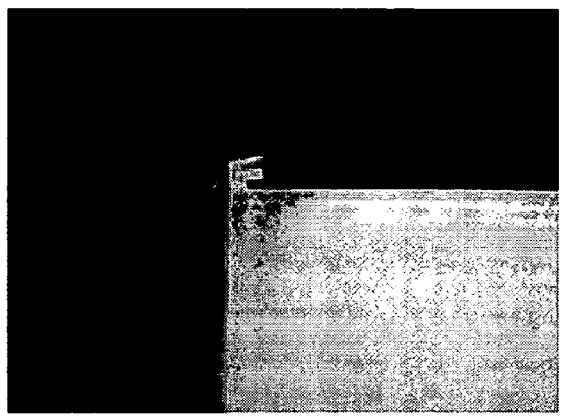
(b)
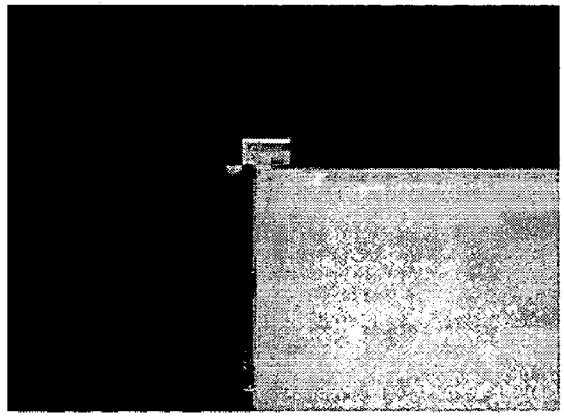
(c)
Fig. 14

(a)
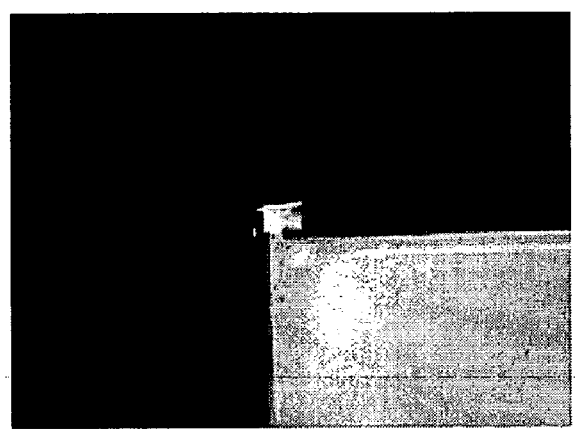
(b)
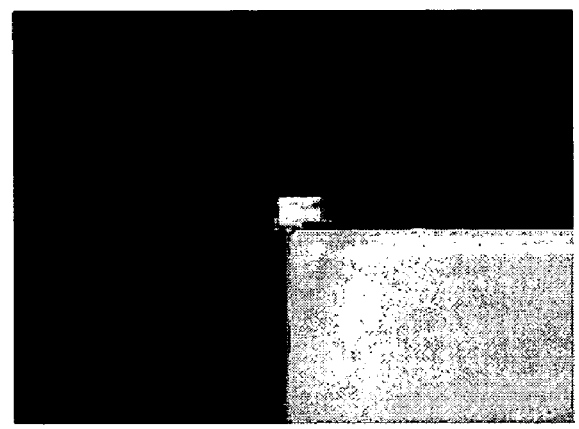
(c)
Fig.15

_US 7,217,026 B2_

ILLUMINATOR, LIQUID CRYSTAL DISPLAY COMPRISING IT AND LAMP SOCKET

BENEFIT OF FOREIGN AND PCT FILINGS

The present application has the benefit of the parent PCT application PCT/JP01/11319 filed Dec. 21, 2001 having a Priority Date of Apr. 18, 2001, under 35 U.S.C. 119, 35 U.S.C. 363 and 35 U.S.C. 365.

TECHNICAL FIELD

The present invention relates to a lighting system, a liquid crystal display device that uses the lighting system, and a lamp socket. More particularly, the present invention relates to a lighting system that, in order to maintain a light source, resolves the problem presented by dark areas around the corners of a display that are near lamp sockets, a liquid crystal display device, and a lamp socket used therefor.

BACKGROUND

When in use, the various types of lighting systems for emitting light from the rear are employed as backlights for liquid crystal display devices. Side light devices are especially frequently employed for small and compact liquid crystal display devices in order to save on installation space. For such side light devices, light sources, such as a small fluorescent tubes, are disposed horizontally, and light guide plates are employed that scatter light emitted by the light sources in directions perpendicular to incident directions. FIG. 16 is a diagram showing a conventional side light device used as a backlight for a light transmitting liquid crystal display device. As is shown in FIG. 16, a conventional side light device 70 comprises: a light guide plate 76, to which light is supplied by a light source 72, such as a small fluorescent tube, and from which incident light is reflected toward a display panel 74; and a reflector 78, for effectively employing the light emitted by the light source 72. While the reflector 78 is extended an occupies a position below the light guide plate 76, for the convenience of the explanation this is not shown in FIG. 16.

The light source 72 is accommodated in the reflector 78 when in use, and emits light to the light guide plate 76 through the plane of incidence (not shown). In FIG. 16, specifically for the explanation, the light source 72 is extracted outside the reflector. The end of the light source 72 is accommodated in a lamp socket 80, which assists in retaining the light source 72 and holding it inside the reflector 78.

The display panel 74 includes a diffusion sheet 74$a$, a prism sheet 74$b$ and a liquid crystal display panel 74$c$. The light guide plate 76 is generally designed to print a white dot pattern, and the light produced thereby is reflected and scattered, substantially perpendicularly, so that it irradiates the display panel 74$c$ as uniformly as possible. A lead line 82 from the end of the lamp socket 80 is introduced to enable, from the outside, the supply of power.

FIG. 17 is a diagram showing the detailed configuration of a small fluorescent tube used as the light source 72. As is shown in FIG. 17, the light source 72 is formed of an almost hollow glass tube, and includes a luminous portion 72$a$, which is coated with a fluorescent material containing a rare earth that emits a white light; and a graphitized portion 72$b$, which is formed at the end of the light source 72, adjacent to the luminous portion 72$a$. Since the light emission by the fluorescent material is not satisfactorily transmitted through the graphitized portion 72$b$, the light emitted from the light source 72 becomes non-uniform. The lead line 82 extended from the end of the light source 72 to supply power to the light source 72 is connected to a soldered portion 72$c$. In the light source 72, the graphitized portion 72$b$ and the soldered portion 72$c$ constitute a non-luminous portion 72$d$.

FIG. 18 is a cross sectional view, taken along the arrow line A in FIG. 16, of the conventional side light device that employs the above structured light source 72. As is shown in FIG. 18, the light source 72 is supported by the lamp socket 80, and radiates light to the light guide plate 76. A non-displaying area 84 is formed on the outer wall of the light guide plate 76 in order to prevent the non-uniform emission of light from the outer circumference. The inside of the non-displaying area 84 serves as a displaying area 86 for a liquid crystal display panel.

The lamp socket 80 shown in FIGS. 16 to 18 is formed of various types of materials that comply with a flame-retardant standard, such as V-0, V-1 or V-2. In many cases, in order to comply with the above flame-retardant standard, a flame-retardant, such as antimony oxide, phosphoric ester, a nitrogen-content compound, a halogen compound, a polyol compound or zinc borate ($ZnO \cdot 2B_2O_3 \cdot 3.5H_2O$), and a filler, such as mica, talc, silica or alumina, are mixed together and used, or either one is filled. Generally, a lamp socket material and a flame-retardant are added to obtain a required flame-retardant property. Thus, the transmittance of light is lost, and in correlation with the above described non-luminous portion, satisfactory light irradiation is not performed at the corners of the light guide plate 76, i.e., corner shading 88 occurs.

FIG. 19 is a detailed diagram showing the corner shading 88 of one of the corners of the light guide plate 76. Recently, an improvement in display quality and a reduction in the thicknesses of devices and the widths of frames have been considered for liquid crystal display devices, particularly for light transmitting liquid crystal display devices. Therefore, the non-luminous portion 72$d$ must be within the part of the light guide plate 76, and as a result, the lamp socket 80 is extended inside the displaying area (a≧b). In this case, "a" denotes the length of the lamp socket 80 and "b" denotes the distance from a frame 92 to the end of a displaying area 86.

Because of the designs of the light source 72 and the peripheral members, the non-luminance portion 72$d$, near the electrode of the light source 72, must also be extended to the displaying area 86 of the light guide plate 76, and as a result, greater shading occurs in the vicinity of the light guide plate 76 (a+c≧b). In this case, "c" denotes the length of the non-luminous portion 72$d$ that extends out and over the lamp socket 80. And when the non-luminous portion 72$d$ is extended out to the displaying area 86, corner shading 88 occurs.

In order to provide a thin display device, such as a thin, light transmitting liquid crystal display device having a narrower frame, corner shading 88 would greatly affect the uniformity in the luminance of a display, and the display portions, particularly the corners adjacent to the light source 72, would become dark. Therefore, corner shading 88 is regarded as a barrier to the downsizing of a liquid crystal display device and the increasing of its screen size.

The reason corner shading 88 is generated will be further explained by referring to FIG. 19. Before entering the light guide plate 76, the diffused light emitted by the light source 72 is refracted, as follows, in accordance with Snell's law.

[Equation 1]

$$n_1 \sin \theta_1 = n_2 \sin \theta_2 \qquad (1)$$

wherein $n_i$ denotes the refractive index of medium i and $\theta_i$ denotes the refractive angle at the medium i. When $n_1=1.0$ (air) and $n_2=1.49$ (acrylic resin), $\theta_2=42.15°$ is obtained. Therefore, when an opaque lamp socket 80 is employed for the light guide plate 76, corner shading 88 occurs at a point about 48° from the end of the effective non-luminous portion, including the lamp socket 80. Further, in this invention, since in order to prevent corner shading 88 it is required that shading for the lamp socket 80, at least in the displaying area 86, should not be formed, in FIG. 19 the shading must be retracted down and into a d(1+tan 42°) shaded area 90.

Therefore, the use of a transparent lamp socket has also been considered. However, so long as the non-luminous portion 72d of the light source 72 extends out into the displaying area 86, corner shading 88 can not be reduced, regardless of whether or not a transparent lamp socket is employed. That is, since in order to effectively reduce corner shading 88 the shading produced by the non-luminous portion 72d must be effectively removed, not only must a transparent lamp socket be employed, but it is inevitable that light from the light source must be transferred to the portion of the non-luminous portion 72d wherein the shading is formed.

Therefore, a demand exists for a lighting system that can effectively reduce corner shading 88, a liquid crystal display device that includes such a lighting system, and a lamp socket therefor.

SUMMARY OF THE INVENTION

Through careful study, the present inventors found that when light is scattered through the entire lamp socket, the shading predicted, in accordance to Snell's law, for the length of the non-luminous portions of a light source can be effectively reduced, even if the non-luminous portions extend into the displaying areas of a light guide plate. In accordance with this discovery made by the inventors, they have finally provided the present invention. That is, in accordance with a lamp socket used for a side light device for the invention, since the light is scattered and is then transmitted, even areas outside those that are predicted in accordance with Snell's law are irradiated by the light from the light source, so that corner shading 88 can effectively be reduced.

Specifically, according an embodiment of the present invention, a lighting system comprises:

a light transmitting member, having a plane of incidence into which light enters and a plane of emission from which the light is emitted;

a light source, having a luminous portion and a non-luminous portion, that is located adjacent to the light transmitting member so that the light transmitting member is irradiated by light;

a lamp socket, for holding at least one end of the light source; and a reflector, which is extended along the light source for reflecting the light produced by the light source, wherein the lamp socket exhibits a transmittance of 20 to 90% in wavelengths of from 300 to 900 nm, and the light is scattered through the lamp socket.

According to an embodiment of the invention, it is preferable that the lamp socket hold all of the non-luminous portion of the light source, and that the lamp socket have a length that is three to ten times the diameter of the light source. In this invention, the lamp socket is made of a thermosetting resin or a thermoplastic resin. Further, in this invention, the lamp socket includes a filler or a domain of resin having a different refractive index from thermosetting resin or thermoplastic resin, in order to scatter the incident light. In this invention, the lamp socket contains a color control agent for controlling a color at the end of the light source. Furthermore, in this invention, it is preferable that the light guide plate include a tapered portion that inclines toward the lamp socket. In this invention, the light source may include a white fluorescent layer that covers the non-luminous portion.

According to an embodiment of invention, a liquid crystal display device comprises:

a liquid crystal display panel, which includes a displaying area and a non-displaying area enclosing the displaying area; and a backlight unit, which is located adjacent to the liquid crystal display panel for irradiating the liquid crystal display panel with light, wherein the backlight unit includes a light guide plate, having a plane of incidence into which light enters and a plane of emission from which the light radiates, a light source, having a luminous portion and a non-luminous portion, that is located adjacent to the light guide plate so that the light guide plate is irradiated by light, a lamp socket, for holding at least one end of the light source, and a reflector, which is extended along the light source for reflecting the light produced by the light source, and wherein the lamp socket exhibits a transmittance of 20 to 90% in wavelengths of from 300 to 900 nm, and the light is scattered through the lamp socket.

According to the liquid crystal display device of the invention, it is preferable that the lamp socket hold all of the non-luminous portion of the light source, and that the lamp socket have a length that is three to ten times the diameter of the light source. For the liquid crystal display device of this invention, the lamp socket is made of a thermosetting resin or a thermoplastic resin. Further, for the liquid crystal display device of this invention, the lamp socket includes a filler or a domain of resin having a different refractive index from thermosetting resin or thermoplastic resin, in order to scatter the incident light. For the liquid crystal display device of this invention, the lamp socket contains a color control agent for controlling a color at the end of the light source. Furthermore, for the liquid crystal display device of this invention, it is preferable that the light guide plate include a tapered portion that inclines toward the lamp socket. For the liquid crystal display device of this invention, the light source may include a white fluorescent layer that covers the non-luminous portion.

According to an embodiment of present invention, a lamp socket is provided that holds a light source, which has a luminous portion and a non-luminous portion and which is located adjacent to a light transmitting member, which has a plane of incidence into which light enters and a plane of emission from which the light radiates, that holds at least one end of the light source, and that exhibits a transmittance of 20 to 90% in wavelengths of from 300 to 900 nm, and the light is scattered through the lamp socket.

BRIEF DESCRIPTION OF THE DRAWINGS

FIGS. 13A and 13B are diagrams showing luminance distribution near the lamp socket of the lighting system of the invention.

FIGS. 14A to 14C are photographs showing shading at the corner in the lighting system of the present invention.

FIGS. 15A to 15C are photographs showing shading at the corner in the lighting system of the present invention.

DETAILED DESCRIPTION OF THE INVENTION

Figure 1:
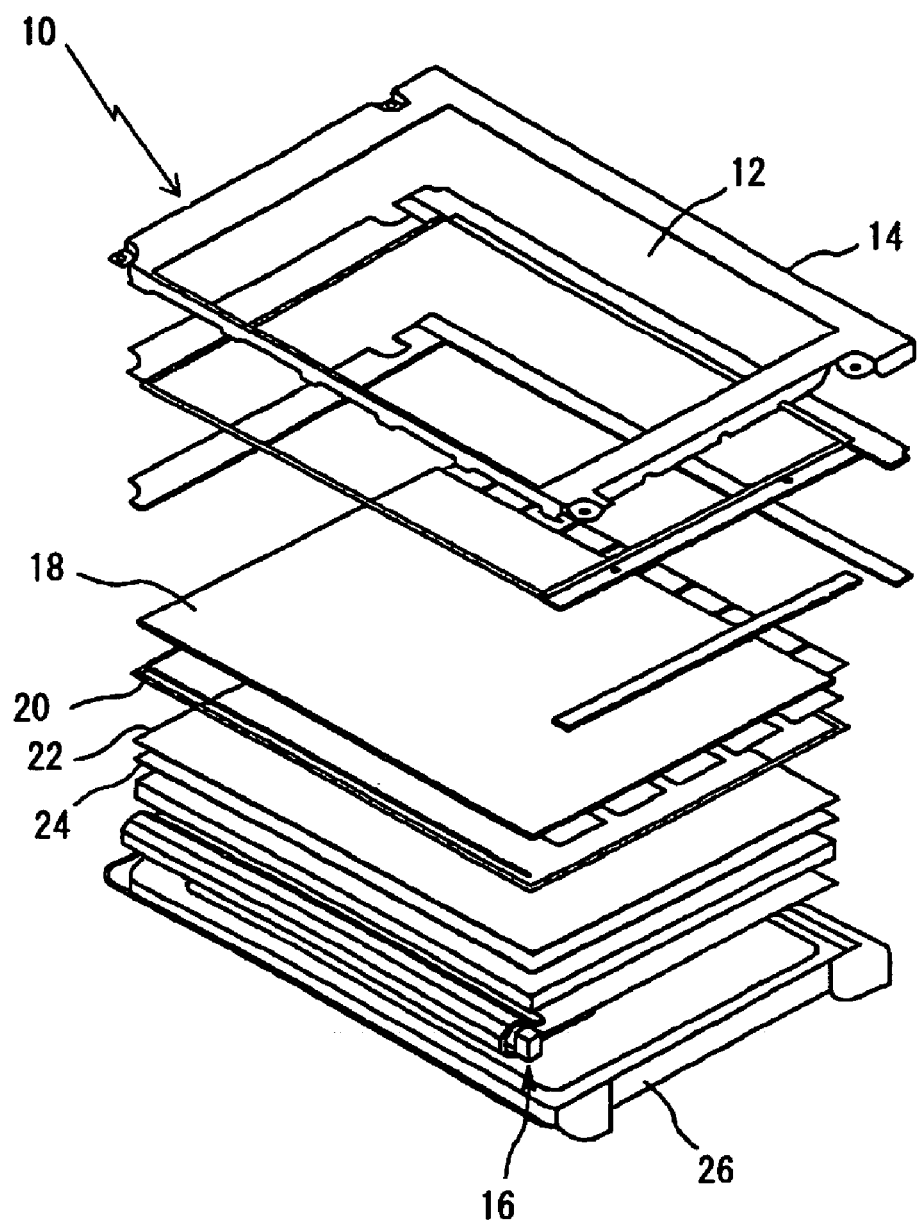
FIG. 1 is an exploded perspective view of a light transmitting liquid crystal display device according to a first embodiment of the present invention.

An explanation will now be given for a lighting system, a liquid crystal display device that includes this lighting system, and a lamp socket used for the display device in accordance with the preferred embodiment of the present invention, wherein the lighting system that is used is a side light device that constitutes a backlight unit. FIG. 1 is an exploded perspective view of a liquid crystal display device that includes a side light device employing the lighting system of the invention. In FIG. 1, a light transmitting liquid crystal display device 10 is shown as an example display device. The light transmitting liquid crystal display device 10 in FIG. 1 comprises: an upper frame 14 defining display window 12, for defining an effective screen for the light transmitting liquid crystal display device 10; a backlight unit 16, which uses the side light device of the invention; a liquid crystal display panel 18, located between the upper frame 14 and the backlight unit 16; a spacer 20; a diffusion sheet 22; and a prism sheet 24. The backlight unit 16 is mounted on a lower case 26, and this structure is held together by the upper frame 14 and constitutes the light transmitting liquid crystal display device 10.

Figure 2:
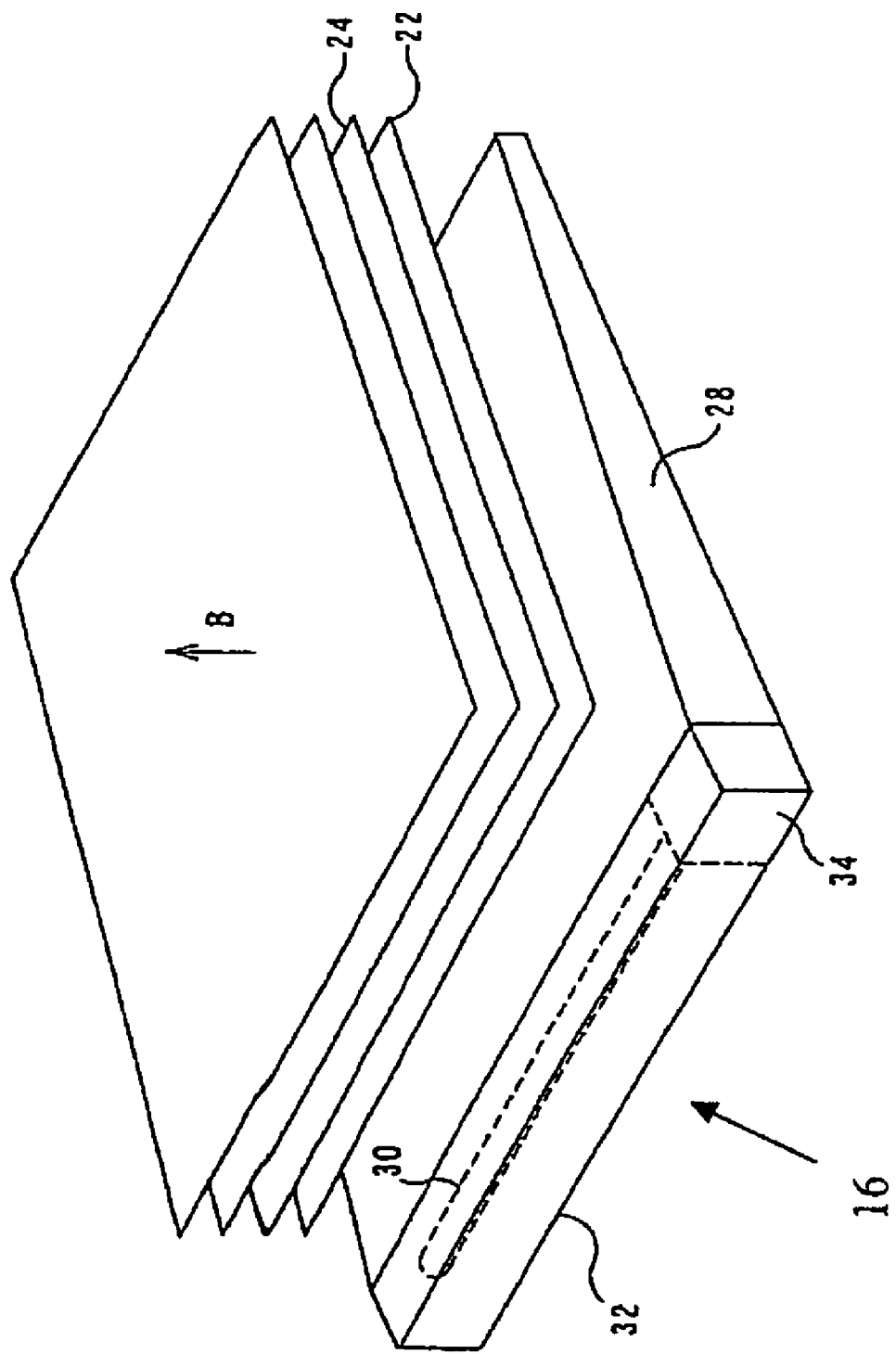
FIG. 2 is a diagram showing a backlight unit including a side light device that employs a lighting system according to the invention.

FIG. 2 is a detailed diagram showing the backlight unit 16, which is constituted by using the side light device of the invention and is used for the light transmitting liquid crystal display device 10 of the embodiment in FIG. 1. The backlight unit 16 in FIG. 2 includes: a light guide plate 28; a light source 30, positioned adjacent to the light guide plate 28; a reflector 32, for covering the light source 30 and for effectively reflecting light from the light source 30 and introducing it to the light guide plate 28; and a lamp socket 34, mounted in the reflector 32 for holding the light source 30. The light guide plate 28 is formed of a light transmitting member, such as an acrylic resin or glass, into which light from the light source 30 can enter and can be transmitted. The reflector 32 is extended along the light guide plate 28 and under the light guide plate 28; however, this extended portion is not shown in FIG. 2. Multiple optical elements, such as the diffusion sheets 22 and the prism sheets 24, are arranged adjacent to the light guide plate 28, and serve as a backlight for the light transmitting liquid crystal display device 10 that outputs, in the direction indicated by an arrow B, light emitted by the light source 30.

Figure 3:
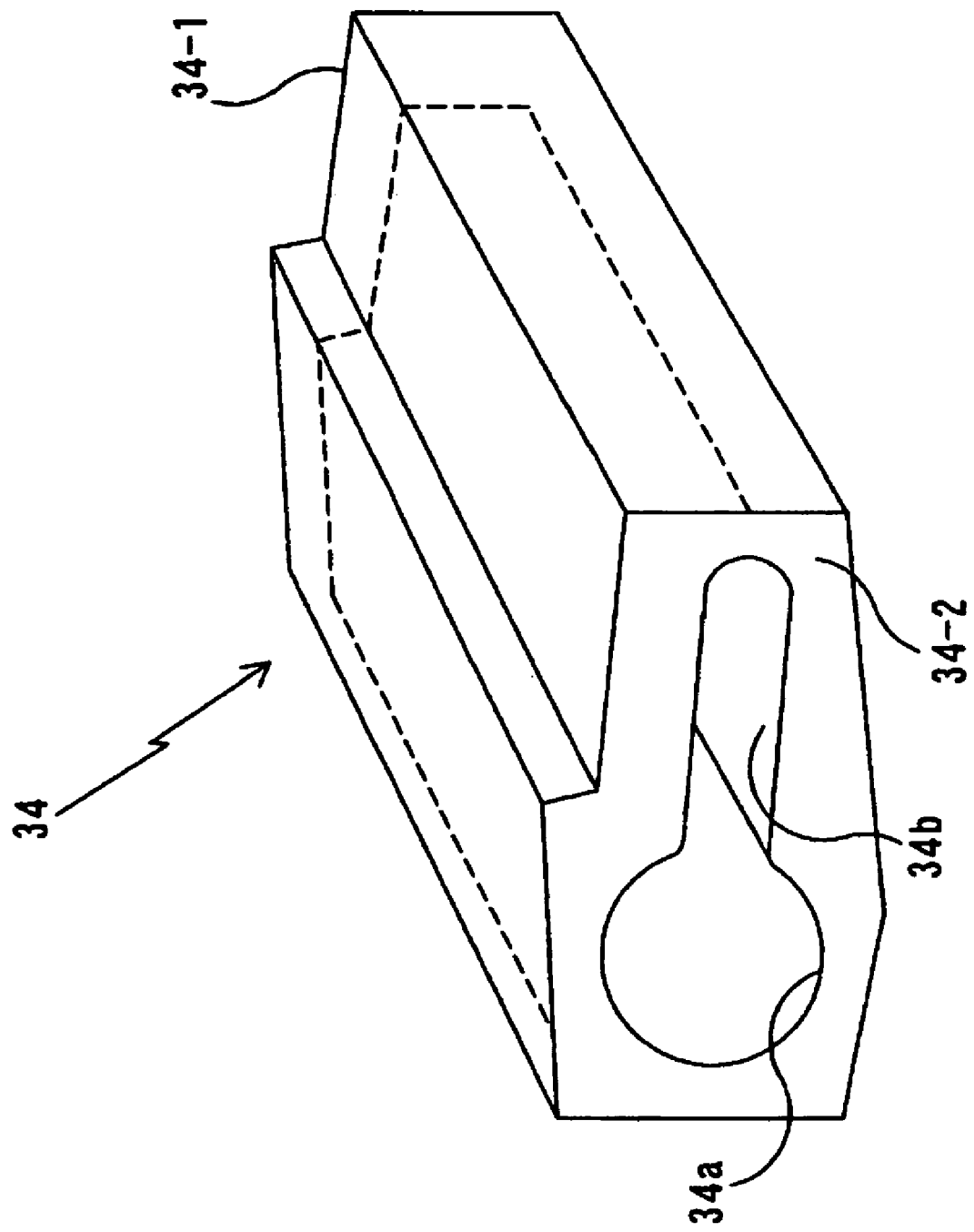
FIG. 3 is a perspective view of a lamp socket according to the embodiment of the present invention.

FIG. 3 is a perspective view of a lamp socket 34 of the present invention. A lamp socket 34 is provided at one end, or both, of a light source 30, such as a small light emitting fluorescent tube. One end 34-1 (not shown) of the lamp socket 34 is closed to hold the lamp, and at the other end 34-2 are formed a light source holder 34a, for holding the light source 30, and a lead line holder 34b, for extracting, to the outside of the lamp socket 34, a lead line connected to the end of the light source 30. The light source holder 34a and the lead line holder 34b hold the light source 30 without distorting the light supplied by the light source 30.

The lamp socket 34 of the invention can be formed of any material, so long as light emitted by the light source 30 can be scattered and is not greatly distorted. Such a material can be, for example, polystyrene; polyethylene; polypropylene; polyethylene terephthalate; polybutylene naphthalate; polyvinyl chloride; polyvinylidene chloride; an acrylate fluoride polymer, such as 1,1-dihydroperfluoro-alkylacrylate; a fluorinated ester polymer, such as a copolymer of chloride adipic acid and hexafluoropentanediol; a trifluoride polymer, such as a copolymer of trifluorochloroethylene and vinylidene fluoride; a hexafluorinated polymer, such as a copolymer of vinylidene fluoride and hexafluoropropylene; a thermoplastic resin, such as fluorinated-silicone polymer based fluoro rubber, a polyamide resin, a polycarbonate resin, an ionomer resin, polyphenylene oxide or polysulfone; or a thermosetting resin, such as a silicone resin, a phenol resin, an urea resin, an epoxy resin, a polyester resin, an alkyd resin, a melamine resin, a polyurethane resin or a polyimide resin; or an arbitrary combination of these materials.

Of these resin materials, an elastic, such as rubber, is especially preferable because it can provide for the lamp socket 34 not only appropriate optical properties but also flexibility. In this respect, silicone rubber is a preferable material that provides for the balancing of optical properties, flexibility and heat resistance.

To effectively prevent corner shading 88 for this invention, it is most preferable that the lamp socket 34 permit light emitted by the light source 30 to be scattered and to pass through. The light scattering available with the lamp socket 34 used for this invention can be represented by a variety of formulas. In this invention, while taking into account the fact that especially satisfactory scattering effects can be obtained with a transmittance equal to or smaller than 90% for a wavelength of 900 nm and equal to or greater than 20% for a wavelength of 300 nm, it is preferable that the lamp socket 34 of the invention be formed of a material that provides a transmittance equal to or smaller than 85% for a wavelength of 800 nm and equal to or greater than 20% for a wavelength of 300 nm. Further, specifically, the lamp socket 34 can be made using a material having a transmittance of about 45% for a wavelength of 400 nm and of about 60% for a wavelength of 500 nm and of about 83% for a wavelength of 800 nm. It should be noted that in this invention transmittance is measured using a market available UVz-VIS spectro-photometer, while a sample material for the lamp socket 34 is 0.5 mm thick.

Further, in this invention, in order for the lamp socket 34 to satisfactorily scatter light, preferably, the material for the lamp socket 34 has a transmittance equal to or greater than 30% for wavelengths of from 300 to 900 nm when the thickness of the lamp socket 34 is 1 mm. That is, in this invention, a so called translucent lamp socket is employed that reflects or absorbs part of the incident light and scatters and transmits the other part, in order to remove the corner shading 88.

Figure 4:
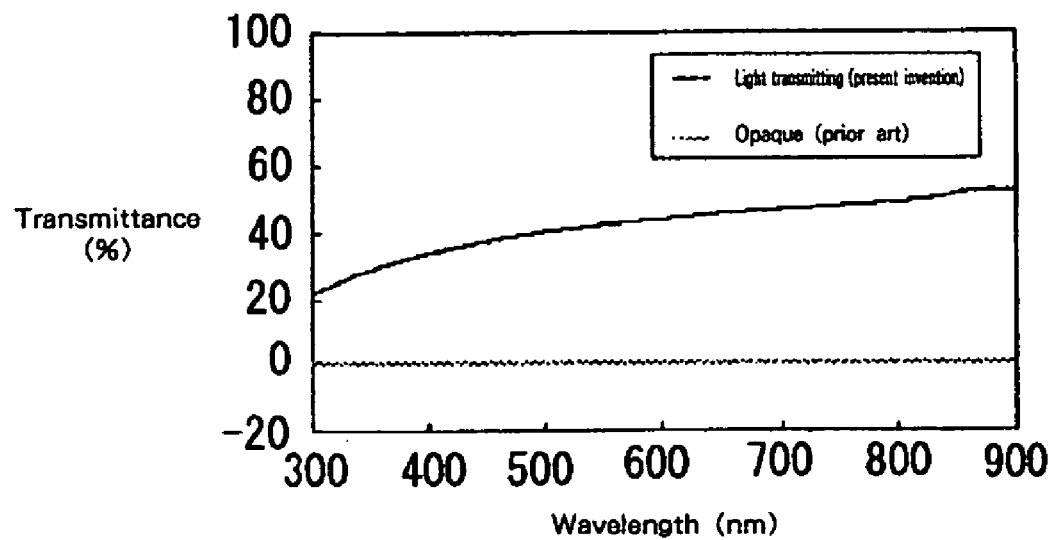
FIG. 4 is a graph showing the transmittance for the lamp socket for the invention.

FIG. 4 is a graph showing a typical transmittance provided by a material forming the lamp socket 34 of the invention. In FIG. 4, the transmittance provided by a material used to form a conventional lamp socket is also shown. As is shown in FIG. 4, the transmittance provided by the lamp socket 34 of this invention is substantially monotonously increased from 300 to 900 nm. This means that in visible light the lamp socket 34 is substantially not colored. Further, when transmittance is too low for the 300 nm wavelength, the end of the visible light end portion especially tends to take on a yellowish tint. And when for the 900 nm wavelength transmittance is too high, light can not be scattered satisfactorily.

Figure 5:
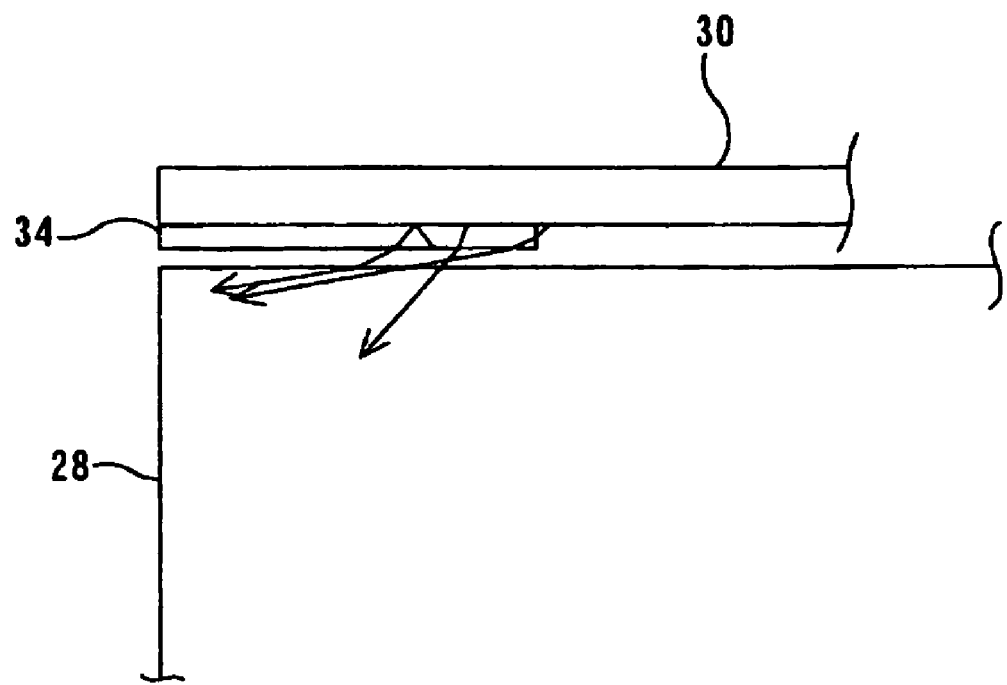
FIG. 5 is a schematic diagram showing the operating effects obtained by the invention.

FIG. 5 is a schematic diagram showing the effects on the reduction of corner shading 88 in the lamp socket 34 of the invention. As is shown in FIG. 5, the lamp socket 34 used for the invention scatters light produced by the light source 30 and irradiates the light guide plate 28 with light, so that the light can be guided to a portion in which shading is conventionally formed by the non-luminous portion of the lamp. Therefore, compared with a lamp socket designed to transmit all light, the occurrence of corner shading 88 can be effectively prevented.

Figure 6:
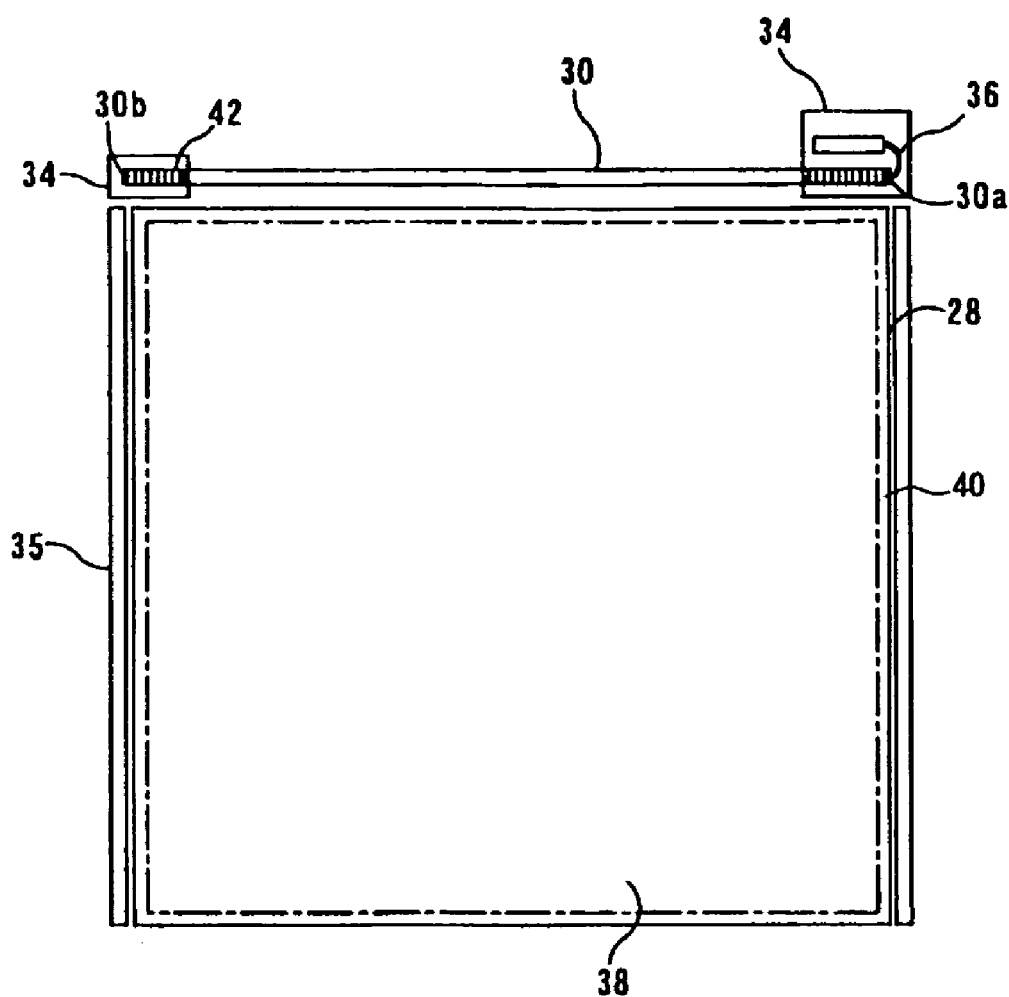
FIG. 6 is a diagram showing the lamp socket according to the invention wherein a light source is held.

FIG. 6 is a diagram showing the lamp socket 34 of the invention, shown in FIG. 3, in which the light source 30 is held and that is located adjacent to the light guide plate 28. In FIG. 6, lamp sockets 34 are disposed above a frame 35 adjacent to a displaying area 38 of the light guide plate 28. A non-displaying area 40 is provided around the displaying area 38, and a non-luminous area 42 of the light source 30 is extended over the non-displaying area 40 inside the lamp socket 34. Further, as is shown in FIG. 6, the lamp socket 34 is so designed that a light source end 30a is held inside it and a lead line 36 leading from the light source end 30a can be connected to the outside.

The lamp socket 34 in FIG. 6 efficiently scatters the light emitted at the end of the light source 30 to discharge the light from the entire lamp socket 34, and effectively leads the light, which is emitted toward the light guide plate 28 by the light source 30, to the portion whereat shading of the corner of the light guide plate 28 occurs, regardless of whether the non-luminous portion 42 is present at the ends 30a and 30b.

In FIG. 6, lamp sockets 34 are positioned at either end of the light source 30, but for this invention a lamp socket 34 may occupy a position at only one end. Further, in FIG. 6, the lamp sockets 34 are positioned so that they are shifted away from the light guide plate 28 at angles of 90°. However, in this invention, if possible relative to the arrangement of the side light device, lamp sockets 34 are positioned adjacent to the light guide plate 28.

Figure 7:
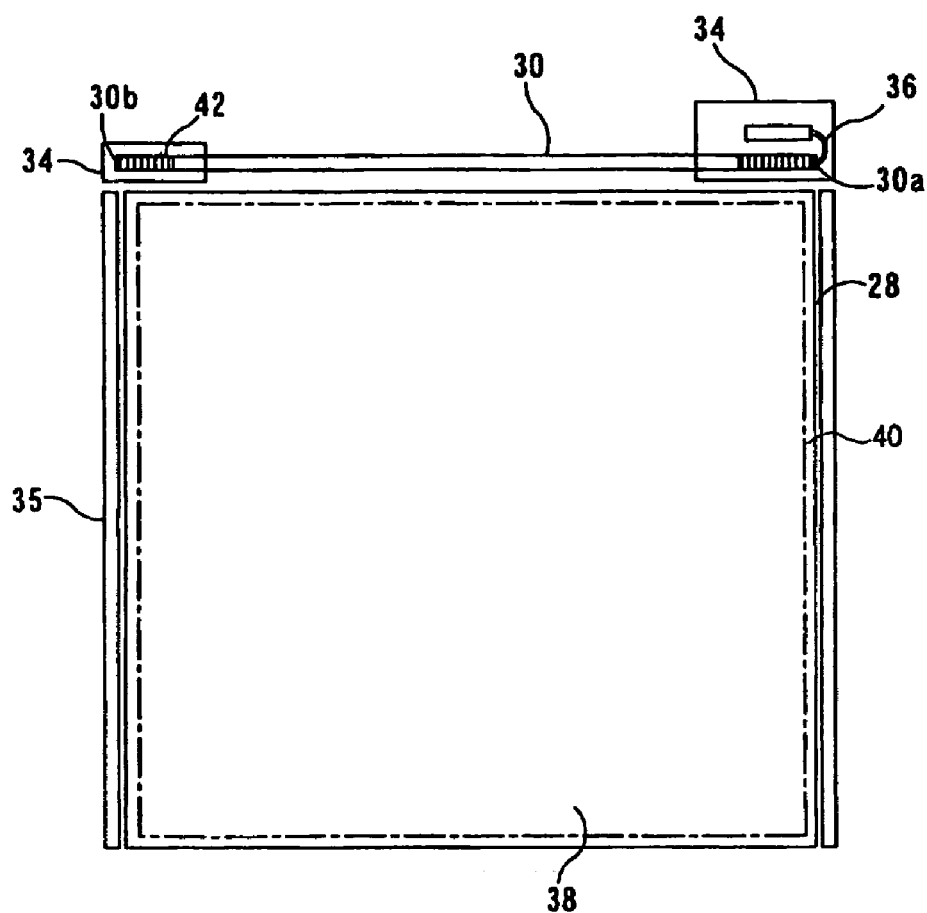
FIG. 7 is a diagram showing a lighting system according to a second embodiment of the present invention.

FIG. 7 is a diagram showing a side light device, according to the present invention, for which the lengths of the lamp sockets 34 are increased. In the side light device in FIG. 7, as well as in FIG. 6, lamp sockets 34 are located at both ends of the light source 30 to reduce the shading at the corner. Further, in the second embodiment in FIG. 7, the lamp sockets 34 located at the ends have lengths that are 1.5 times the lengths of the lamp sockets 34 in FIG. 6, so as to sufficiently cover the non-luminous portions 42 of the light source 30 and to increase the light scattering and diffusion effects.

In this embodiment, an arbitrary length can be provided for a lamp socket 34 so long as the non-luminous portion is adequately covered. However, while taking into account the general length of the non-luminous portion and that light is satisfactorily led to the corners of the light guide plate 28, it is preferable that the length of a lamp socket 34 of the invention be substantially three to ten times the diameter of the light source 30, so that the effect produced by the non-luminous portions 42 can be satisfactorily reduced.

Figure 8:
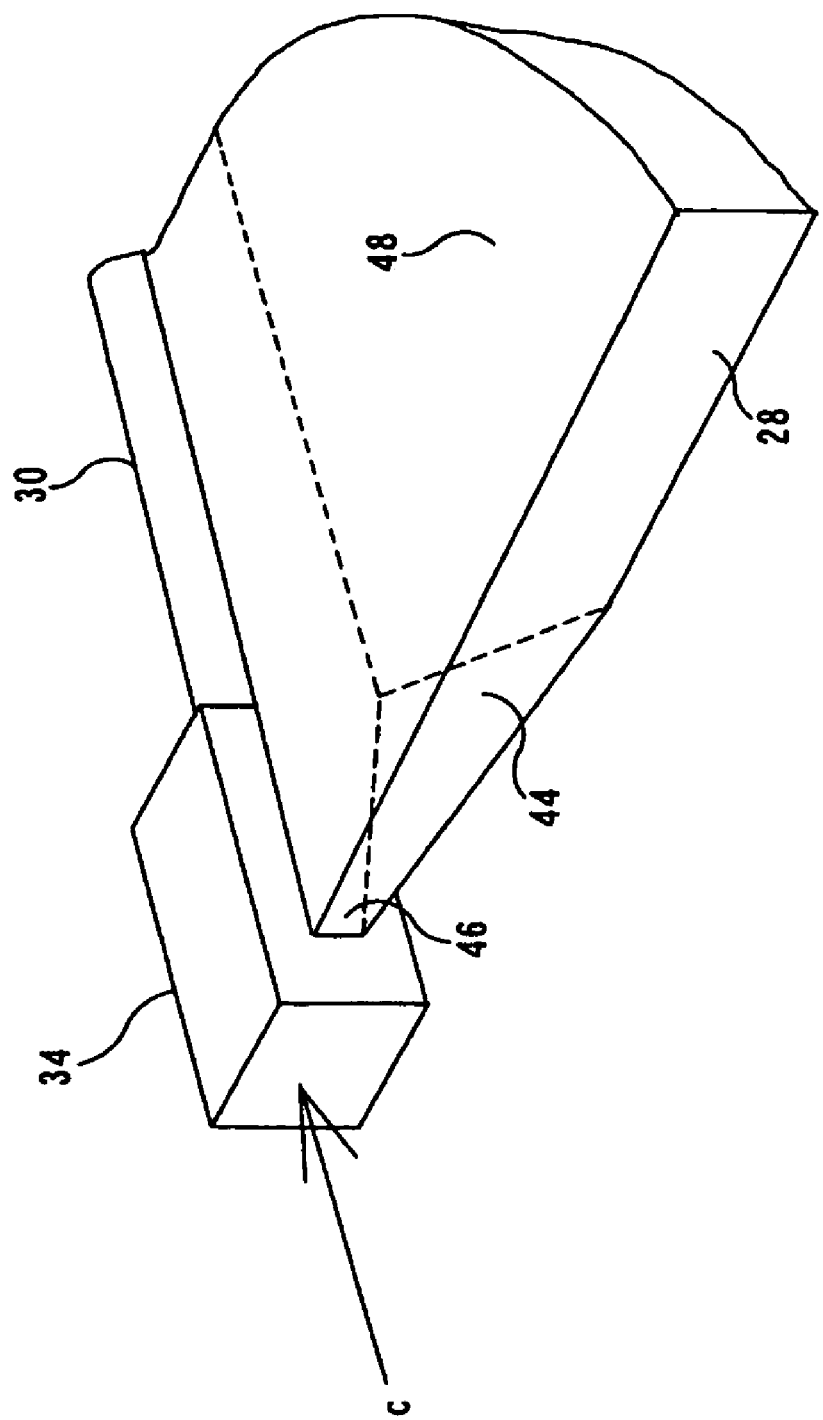
FIG. 8 is a diagram showing a lighting system according to a third embodiment of the present invention.

FIG. 8 is a diagram showing a side light device according to a third embodiment of the present invention. In the third embodiment of the present invention, a tapered portion 44 is formed for the light guide plate 28, at a position corresponding to a lamp socket 34, that tapers, becoming thinner, as it approaches the lamp socket 34. The tapered portion 44 can effectively increase a plane of incidence 46 that scattered light emitted by the light source 30 enters, and the light that is transmitted from an emission plane 48 to a liquid crystal display panel (not shown) is radiated uniformly. To further improve light scattering, fine concavo-convex textured portions may be formed on the tapered portion 44.

As is shown in FIG. 8, since the tapered portion 44 and the lamp socket 34 of the invention are employed together, not only are the light scattering effects of the lamp socket 34 provided, but also the plane of incidence can be increased at the corners of the light guide plate 28. Therefore, shading at the corner can efficiently be reduced.

Figure 9:
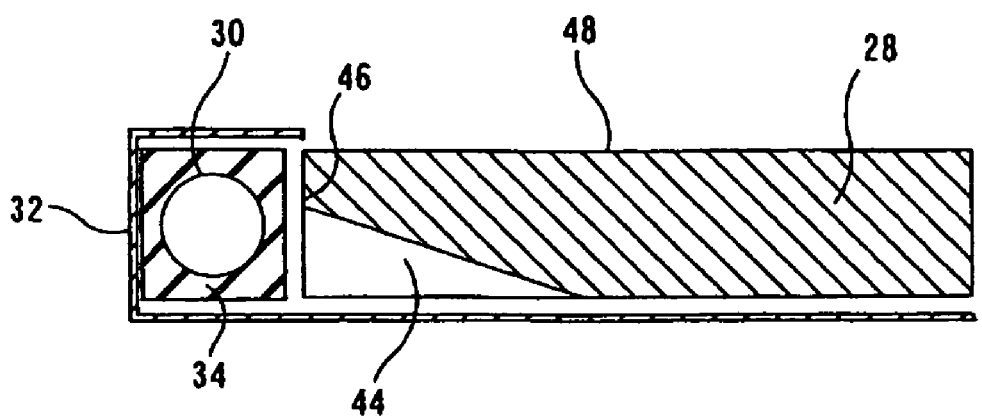
FIG. 9 is a side cross-sectional view of the lighting system in FIG. 8 viewed from the direction indicated by an arrow C.

FIG. 9 is a cross-sectional side view of the side light device according to the third embodiment of the present invention, viewed from the direction indicated by an arrow C in FIG. 8. As is shown in FIG. 9, the tapered portion 44 is formed on the side of the light guide plate 28 adjacent to the lamp socket 34, and the plane of incidence 46 is increased relative to the light that is emitted by the light source 30, held in the lamp socket 34, and the reflector 32.

In addition, for a side light device according to a fourth embodiment of the invention, a color control agent for controlling the light emission spectrum of the light source 30 is added to the material of the lamp socket 34. In many cases, the light source 30 is formed of a member, such as a small fluorescent tube, filled with gases such as mercury vapor, neon and argon. These gases are ionized by an electrical discharge and render the fluorescent member luminous. The light-emission characteristic may differ at the end. In this case, in order to provide the white spectral characteristic, an effective procedure is for a sorbent, such as a dye or a pigment, or a color control agent, such as a fluorescent brightening agent, to be added to the lamp socket 34 in advance.

As the sorbent of choice, in accordance with its absorption spectrum, any conventional color agent or dye can be used. Further, as the fluorescent brightening agent, any conventional material can be used. At this time, if the fluorescent brightening agent can be uniformly dispersed in the lamp socket 34, fluorescence is generated substantially symmetrically at the center of the light source, so that the same light scattering effects can be obtained as in an embodiment, which will be described later, wherein a filler is added.

Figure 10:
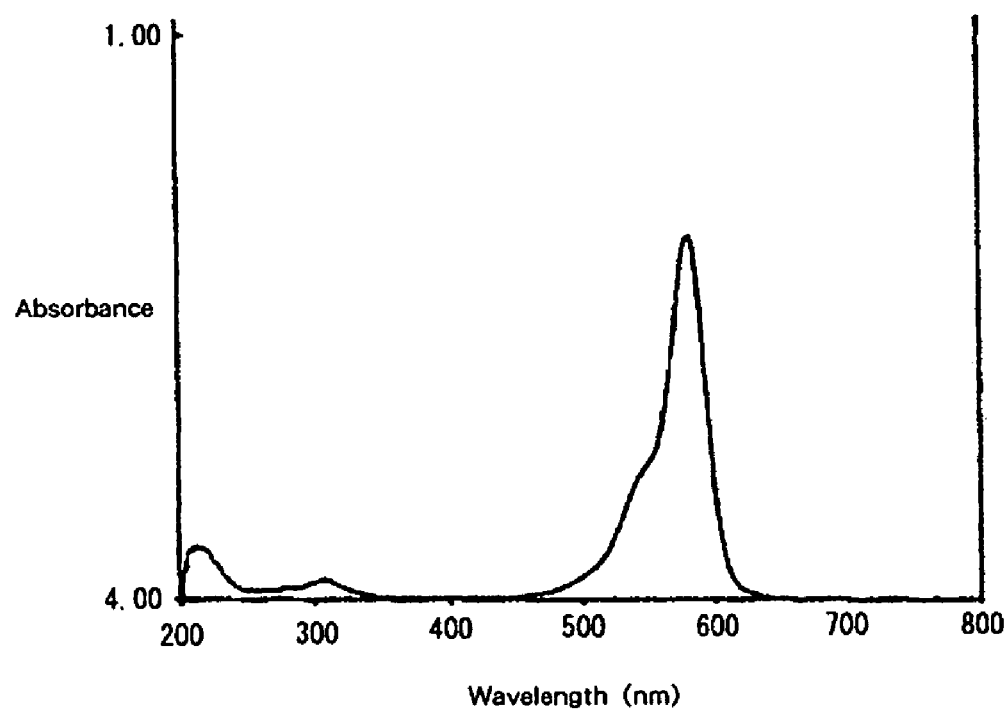
FIG. 10 is a graph showing the absorption spectrum of the lamp socket.

FIG. 10 is a diagram showing the absorption spectrum according to the fourth embodiment of the invention when dye is mixed in the lamp socket 34. The absorption spectrum shown in FIG. 10 corresponds to a case wherein the light source 30 emits a light that is almost orange. Absorption occurs at the light emission peak of the light source 30, and the color of the light passing through the lamp socket 34 is controlled to adjust the emission spectrum so it is close to white.

Figure 11:
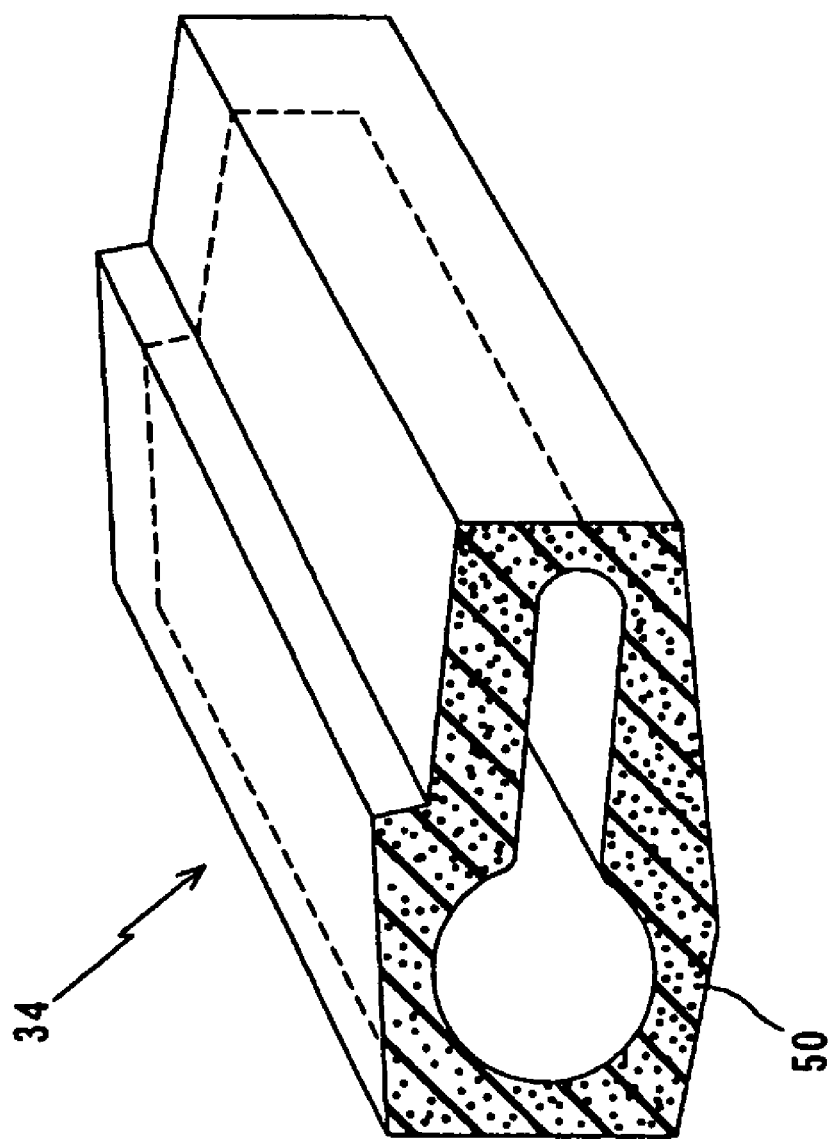
FIG. 11 is a diagram showing a lamp socket used for a lighting system according to a fifth embodiment of the invention.

FIG. 11 is a cross-sectional view of a side light device, according to a fifth embodiment of the present invention, that includes the lamp socket 34 of the invention that is manufactured by adding a filler or a particle. For the side light device of this embodiment, in a process for manufacturing the lamp socket 34, an organic or inorganic filler 50, such as mica, talc, silica, alumina, silicone particles, polymethyl-methacrylate resin particles or polystyrene particles, is added to silicone rubber, for example. The particle diameter of the organic or inorganic filler 50 should be about 0.5 to 10 μm in order to efficiently scatter light. In addition, preferably, the refractive index of the organic or inorganic particle differs from that of the material used to form the lamp socket 34. Further, in this invention, instead of adding the organic or inorganic filler, a resin domain having an island structure is formed in the lamp socket 34 by blending the previously described thermoplastic or thermosetting resins, which have different refractive indexes, so that light scattering can be improved. Furthermore, the above described organic or inorganic filler can be added to this polymer mixture.

In this invention, the organic or inorganic fillers can be appropriately mixed to provide the light scattering property. In addition, in the invention, in order to increase the flame-retardant property, as in the conventional case, at least one flame retardant, such as antimony oxide, phosphoric ester, a nitrogen-content compound, a halogen compound, a polyol compound, platinum and zinc borate ($ZnO \cdot 2B_2O_3 \cdot 3.5H_2O$) can be added, or the mixture thereof can be added.

Figure 12:
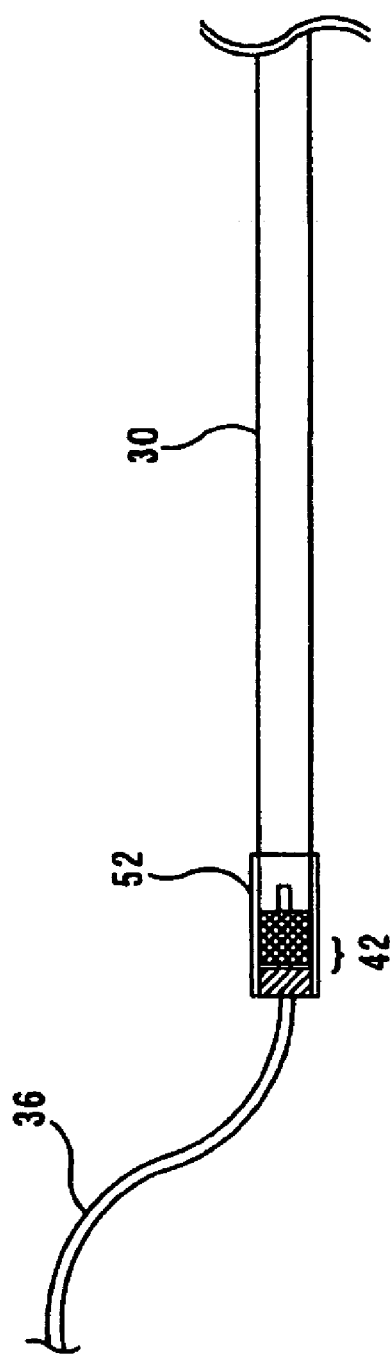
FIG. 12 is a diagram showing a lighting system according to a sixth embodiment of the present invention.
Figure 16:
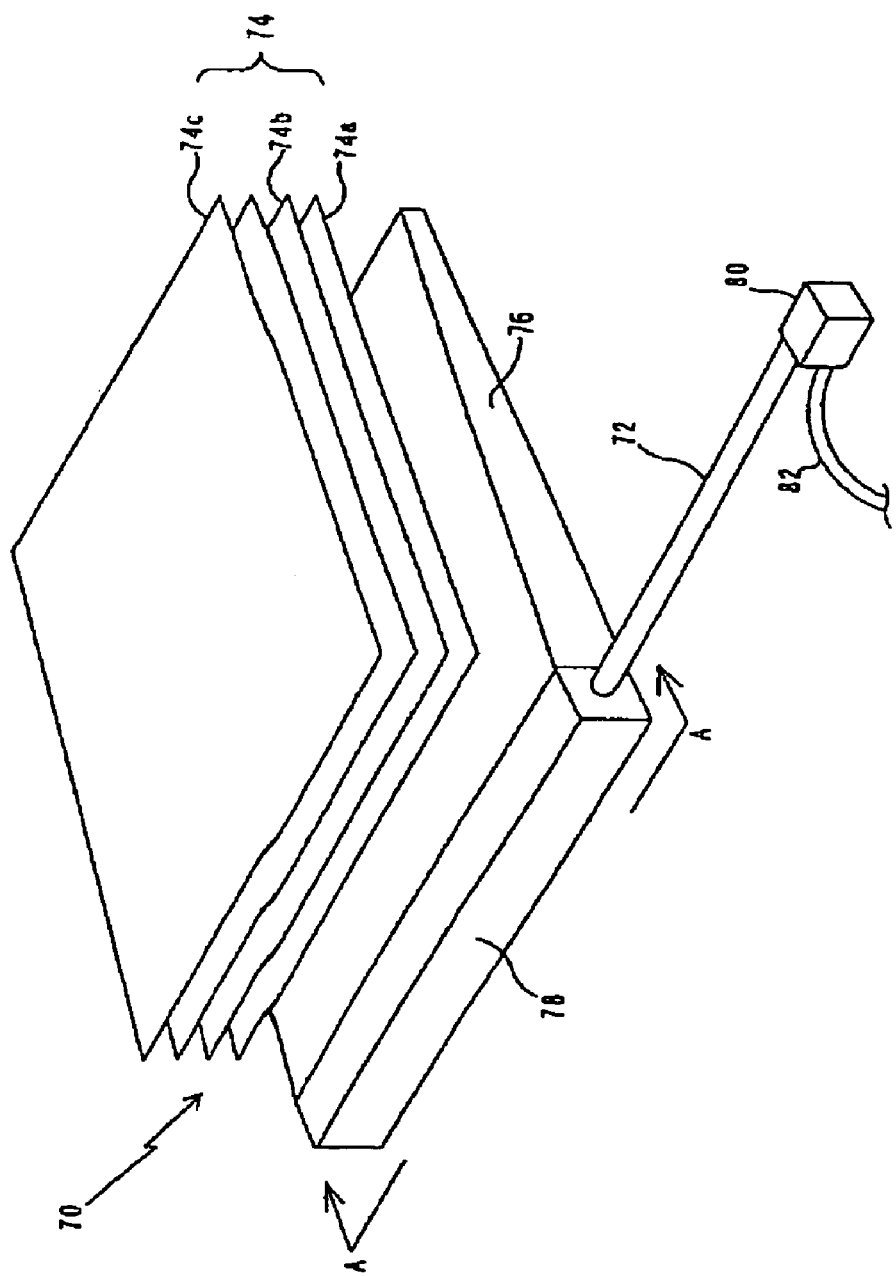
FIG. 16 is a schematic perspective view of the configuration of a conventional lighting system.
Figure 17:
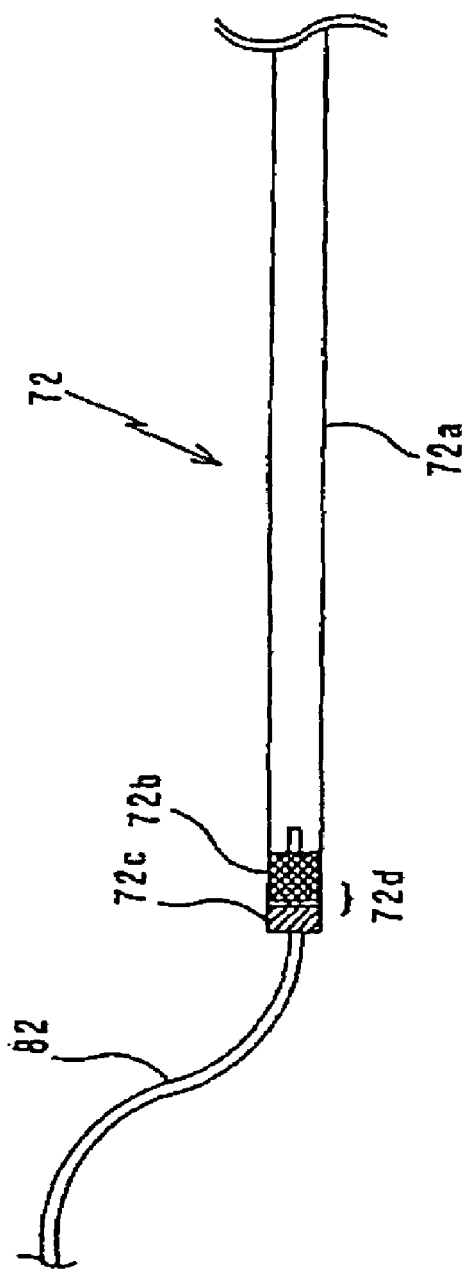
FIG. 17 is a detailed diagram showing the configuration of a light source.
Figure 18:
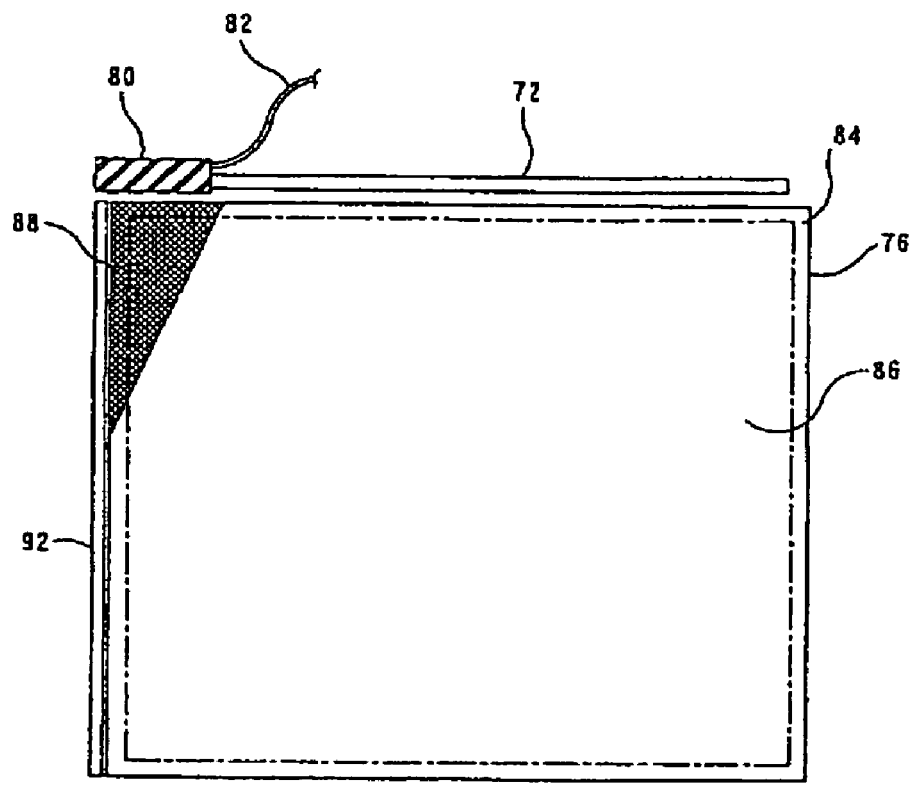
FIG. 18 is a cross-sectional view of the lighting system taken along the line A—A in FIG. 16.
Figure 19:
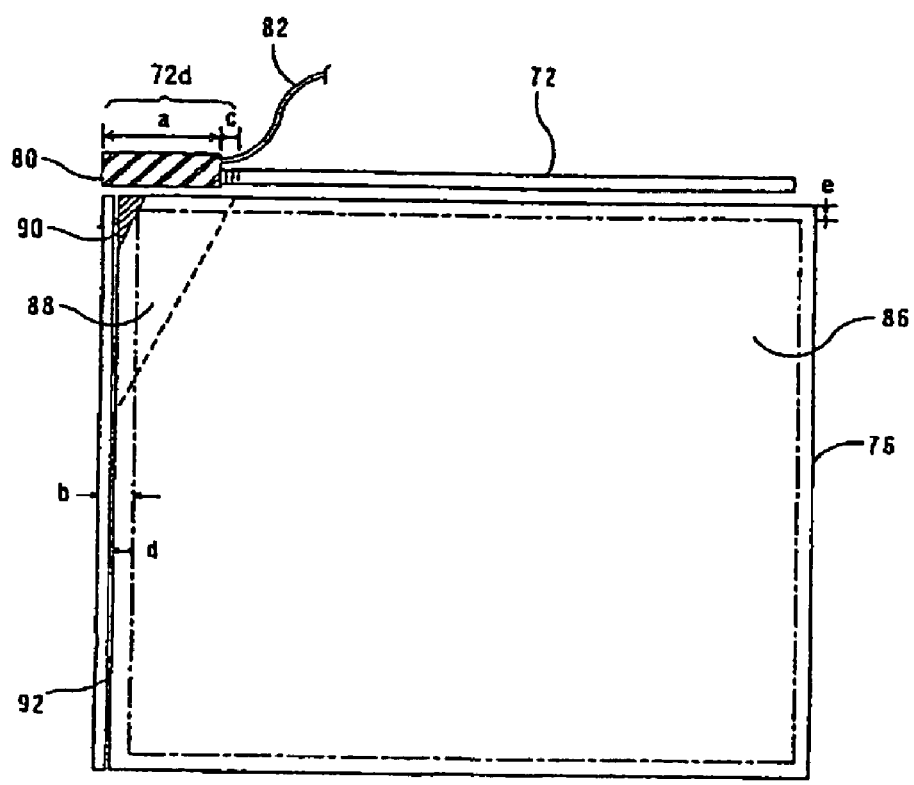
FIG. 19 is a schematic diagram showing the occurrence of shading at the corner for a light guide plate.

FIG. 12 is a diagram showing a side light device according to a sixth embodiment of the present invention. In the sixth embodiment in FIG. 12, on the exterior surface at the end of the light source 30, used for the side light device of the invention, a white fluorescent member 52 is prepared by coating the area corresponding to the non-luminous portion 42. As a result of the addition of the white fluorescent member 52, the amount of light discharged through the lamp socket 34 is increased and the shading at the corner can be further reduced.

FIGS. 13A and 13B are diagrams showing the luminance contour lines for the light guide plate 28, near the lamp socket 34, based on the measuring results obtained by a side light device employing a conventional lamp socket and the side light device according to the invention. The luminance contour map in FIG. 13A represents the corner shading 88 near the end of the light guide plate 28 when the conventional lamp socket 34 is used, and the luminance contour map in FIG. 13B represents the corner shading 88 near the end of the light guide plate 28 when the lamp socket 34 of the invention is employed. In FIGS. 13A and 13B, the lower the density, the higher the luminance, and the origins of luminance contour lines of 250 cd/m² are indicated by arrows.

As is shown in FIG. 13A, when the conventional opaque lamp socket 34 was employed, shading occurred that clearly extended into the displaying area. When the transparent lamp socket 34 of the invention was employed, however, as is shown in FIG. 13B, light was scattered to the outside of the corner of the light guide plate 28 whereat shading was formed, and it is clearly shown that the area expanded in which a luminance reading of 250 cd/m² was obtained, indicating that shading at the corner was reduced. The areas on the left in FIGS. 13A and 13B are areas wherein the luminance reading was 50 cd/m², and correspond to the position of the frame 35.

FIGS. 14A to 14C are photographs showing shading at the corner when the conventional lamp socket 34 and those of the invention were used with the side light device. In FIG. 14A, shading at the corner is shown for the side light device using the conventional lamp socket 34; in FIG. 14B, shading at the corner is shown for the first embodiment; and in FIG. 14C, shading at the corner is shown for the second embodiment.

In FIG. 14A for the side light device using the conventional lamp socket, heavy shading at the corner has occurred. However, in FIG. 14B, for the side light device provided for the first embodiment of the invention, it is apparent that the shading at the corner is greatly reduced. And in FIG. 14C, for the second embodiment wherein the lamp socket is extended, the shading at the corner is retracted to the vicinity of the frame area and substantially disappears.

FIGS. 15A to 15C are photographs showing the side light device according to the third embodiment of the invention. In FIG. 15A, the shading at the corner shown was obtained when the conventional lamp socket was used for the light guide plate 28 having the tapered portion 44, and in FIGS. 15B and 15C, shadings at the corner shown are those provided when the lamp socket 34 of the invention and the light guide plate having the tapered portion were used for the third embodiment. In FIG. 15B, a lamp socket 34 having the normal length was employed, and in FIG. 15C, a lamp socket 34 that was about 1.5 times the normal length was employed.

Since as is shown in FIGS. 15B and 15C the shading at the corner that is seen in FIG. 15A almost disappears, it is apparent that when the lamp socket 34 of the invention and the light guide plate 28 having the tapered portion 44 are employed together, shading at the corner can be substantially eliminated.

As is described above, according to the invention, a lighting system is provided that can efficiently reduce shading at the corner and effectively use a displaying area, and a liquid crystal display device using this lighting system and the lamp socket therefor can be provided.

The specific embodiments have been explained for the present invention while referring to the accompanying drawings. However, the present invention is not limited to these embodiments, and can be applied not only for a small side light device used to save space, but also for any other application for which the same effects can be obtained, such as a back-light system, for which lighting is supplied from the rear by a light source that is located directly to the rear of a liquid crystal display panel and for which light is emitted through a light-transmitting member, and a display device that includes this lighting system.

The invention claimed is:

1. A lighting system comprising:
   a light transmitting member, having a plane of incidence into which light enters and a plane of emission from which the light is emitted;
   a light source including a luminous portion, a non-luminous portion, and a white fluorescent layer that covers said non-luminous portion, the light source being located adjacent to said light transmitting member so that said light transmitting member is irradiated by light;
   a lamp socket, for holding at least one end of said light source; and
   a reflector, which is extended along said light source for reflecting the light produced by said light source,
   wherein said lamp socket exhibits a transmittance of 20 to 90% in wavelengths of from 300 to 900 nm, and the light is scattered through said lamp socketl;
   wherein said lamp socket is made of a thermosetting resin or a thermoplastic resin; and
   wherein said lamp socket includes a filler or a domain of resin having a different refractive index from thermosetting resin or thermoplastic resin, in order to scatter the incident light.

2. The lighting system according to claim 1, wherein said lamp socket holds all of said non-luminous portion of said light source, and wherein said lamp socket has a length that is three to ten times the diameter of said light source.

3. The lighting system according to claim 1, wherein said lamp socket contains a color control agent for controlling a color at the end of said light source.

4. The lighting system according to claim 1, wherein said light guide plate includes a tapered portion that inclines toward said lamp socket.

5. A liquid crystal display device comprising:
   a liquid crystal display panel, which includes a displaying area and a non-displaying area enclosing said displaying area; and
   a backlight unit, which is located adjacent to said liquid crystal display panel for irradiating said liquid crystal display panel with light,
      wherein said backlight unit includes a light guide plate, having a plane of incidence into which light enters and a plane of emission from which the light is emitted,
      a light source including a luminous portion, a non-luminous portion, and a white fluorescent layer that covers said non-luminous portion, the light source being located adjacent to said light guide plate so that said light guide plate is irradiated by light,
      a lamp socket for holding at least one end of said light source, and
      a reflector, which is extended along said light source for reflecting the light produced by said light source,
      wherein said lamp socket exhibits a transmittance of 20 to 90% in wavelengths of from 300 to 900 nm, and the light is scattered through said lamp socket;
   wherein said lamp socket is made of a thermo setting resin or a thermoplastic resin; and
   wherein said lamp socket includes a filler or a domain of resin having a different refractive index from thermosetting resin or thermoplastic resin, in order to scatter the incident light.

6. The liquid crystal display device according to claim 5, wherein said lamp socket holds all of said non-luminous portion of said light source, and wherein said lamp socket has a length that is three to ten times the diameter of said light source.

7. The liquid crystal display device according to claim 5, wherein said lamp socket contains a color control agent for controlling a color at the end of said light source.

8. The liquid crystal display device according to claim 5, wherein said light guide plate includes a tapered portion that inclines toward said lamp socket.

9. A lamp socket that holds a light source, which includes a luminous portion, a non-luminous portion, and a white fluorescent layer that covers said non-luminous portion, the light source being located adjacent to a light transmitting member, which has a plane of incidence into which light enters and a plane of emission from which the light is emitted, that holds at least one end of said light source, and that exhibits a transmittance of 20 to 90% in wavelengths of from 300 to 900 nm, and the light is scattered through said lamp socket; said lamp socket being constituted of a thermosetting resin or a thermoplastic resin, and includes a filler or domain of resin having a different refractive index from the thermosetting resin or thermoplastic resin in order to scatter the incident light.

* * * * *